No. 673,164. Patented Apr. 30, 1901.
O. B. FIKE.
SIDING CLAMP.
(Application filed Dec. 1, 1900.)
(No Model.)
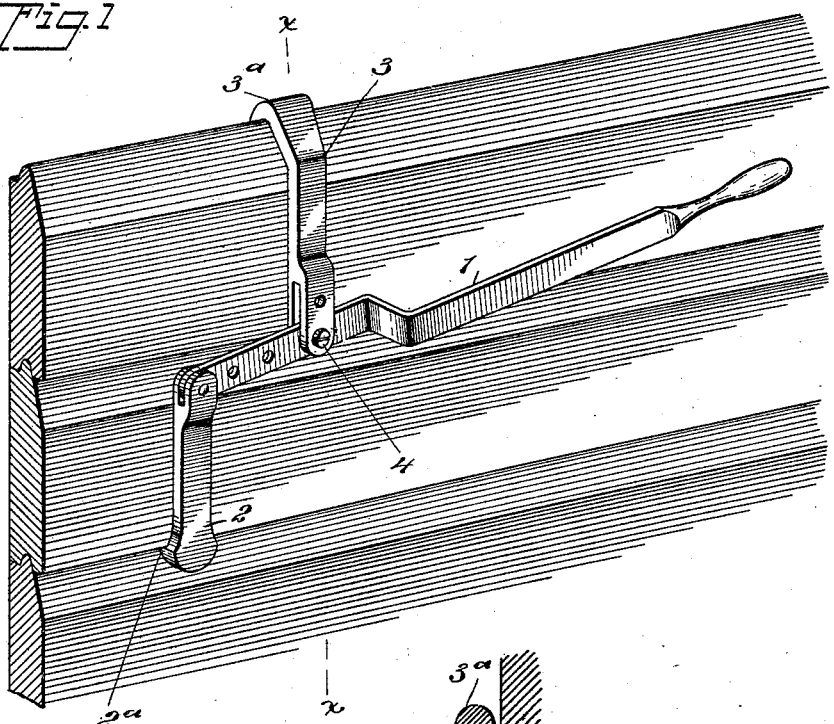
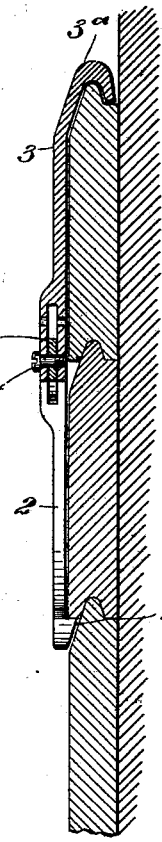
WITNESSES:
INVENTOR
Oscar B. Fike
BY
ATTORNEYS

UNITED STATES PATENT OFFICE.

OSCAR B. FIKE, OF JOPLIN, MISSOURI.

SIDING-CLAMP.

SPECIFICATION forming part of Letters Patent No. 673,164, dated April 30, 1901.

Application filed December 1, 1900. Serial No. 38,296. (No model.)

*To all whom it may concern:*

Be it known that I, OSCAR B. FIKE, a citizen of the United States, and a resident of Joplin, in the county of Jasper and State of Missouri, have invented a new and Improved Siding-Clamp, of which the following is a full, clear, and exact description.

This invention relates to improvements in clamps for siding-boards for buildings, particularly drop-siding; and the object is to provide a clamp of simple construction that may be easily manipulated for clamping or holding a warped or buckled top board in place while nailing it and that may be slid from one end of a board to the other without interference from the studding, and, further, to so construct the device that it may be readily changed for operation by either the right or left hand.

I will describe a siding-clamp embodying my invention and then point out the novel features in the appended claims.

Reference is to be had to the accompanying drawings, forming a part of this specification, in which similar characters of reference indicate corresponding parts in both figures.

Figure 1 is a perspective view of a siding-clamp embodying my invention, showing the same as applied; and Fig. 2 is a section on the line $x\,x$ of Fig. 1.

The clamp comprises a hand-lever 1, which when the device is in use extends parallel with or lengthwise of the board, so that the machine may be employed in narrow spaces. To prevent a person's hands from coming in contact with the siding while operating the lever, the said lever is bent outward, so that its free end sufficiently clears the siding, as plainly indicated in Fig. 1. Pivotally connected to the end of the lever is a dog 2, having a hook portion $2^a$ at its end designed to engage with the under edge of a siding-board nailed on the studding. Also pivotally connected to the lever rearward of the dog 2 is a top-engaging dog 3, having a hook end $3^a$ to engage over the bead at the top edge of a board to be nailed. It will be noted that this hook end of the dog 3 does not extend to the rear surface of the board. Therefore the device may be slid from end to end of a board without coming in contact with the studding, as indicated in Fig. 2.

The lever 1 is provided with a series of holes, in either one of which the pivot-screw 4 for the dog 3 may be placed, so as to change or adjust the leverage or to adjust the device to different widths of siding-boards. The device may be changed for use by either the right or the left hand of an operator by removing the pivot-screw of the dog 3 and reversing the lever and then again adjusting the dog to the changed position.

The operation of the device is quite obvious. It may be stated, however, that as it may be readily operated by one hand the other hand is left free for driving the nails, and it may be slid along the boards without detaching it therefrom. Therefore it is not liable to be dropped from a scaffold.

Having thus described my invention, I claim as new and desire to secure by Letters Patent—

1. A siding-clamp, comprising a lever, and oppositely-extending clamping-dogs, pivoted directly to the lever, one of said clamping-dogs having a hook end to engage over a bead at the top edge of a board to be nailed, and the other clamping-dog having a hook portion at its end formed with a straight upper face to engage with the under edge of a siding-board nailed on the studding, substantially as described.

2. A siding-clamp, comprising a lever having an offset portion at one end, a clamping-dog pivoted to the end of said offset portion of the lever, and having a hook portion at its end formed with a straight upper face to correspond with the under edge of a siding-board nailed on the studding, and an oppositely-extending clamping-dog pivoted on said offset portion of the lever and having a hook portion shaped to engage over the bead at the top edge of the board to be nailed, the said hook portion being constructed to have free movement along the upper edge of the board without coming in contact with the studding, substantially as specified.

In testimony whereof I have signed my name to this specification in the presence of two subscribing witnesses.

OSCAR B. FIKE.

Witnesses:
WILLIAM M. GLADISH,
WILLIAM A. SMITH.